US007069264B2

(12) United States Patent
Anjur et al.

(10) Patent No.: US 7,069,264 B2
(45) Date of Patent: Jun. 27, 2006

(54) STRATIFIED SAMPLING OF DATA IN A DATABASE SYSTEM

(75) Inventors: Vijayakumar Anjur, Sunnyvale, CA (US); Ambuj Shatdal, Madison, WI (US)

(73) Assignee: NCR Corp., Dayton, OH (US)

( * ) Notice: Subject to any disclaimer, the term of this patent is extended or adjusted under 35 U.S.C. 154(b) by 466 days.

(21) Appl. No.: 10/113,497

(22) Filed: Apr. 1, 2002

(65) Prior Publication Data
US 2002/0198863 A1 Dec. 26, 2002

Related U.S. Application Data

(63) Continuation-in-part of application No. 09/457,274, filed on Dec. 8, 1999, now Pat. No. 6,564,221.

(51) Int. Cl.
*G06F 17/30* (2006.01)
(52) U.S. Cl. .................. 707/4; 707/2; 707/3; 707/100; 707/101; 707/103 R; 707/104.1
(58) Field of Classification Search .................... 707/1, 707/2, 4, 10, 3, 5, 100, 101, 103 R, 104.1
See application file for complete search history.

(56) References Cited

U.S. PATENT DOCUMENTS

| 5,878,426 | A | 3/1999 | Plasek et al. |
| 6,003,036 | A | 12/1999 | Martin |
| 6,205,441 | B1 * | 3/2001 | Al-omari et al. ............... 707/2 |
| 6,223,171 | B1 | 4/2001 | Chaudhuri et al. ............. 707/2 |
| 6,226,629 | B1 * | 5/2001 | Cossock ........................ 707/3 |
| 6,278,989 | B1 * | 8/2001 | Chaudhuri et al. ............. 707/2 |
| 6,282,570 | B1 * | 8/2001 | Leung et al. ................ 709/224 |
| 6,289,334 | B1 * | 9/2001 | Reiner et al. .................. 707/3 |
| 6,519,604 | B1 * | 2/2003 | Acharya et al. ............. 707/102 |
| 6,532,458 | B1 * | 3/2003 | Chaudhuri et al. ............. 707/2 |
| 6,564,221 | B1 * | 5/2003 | Shatdal ....................... 707/102 |
| 6,691,120 | B1 * | 2/2004 | Durrant et al. ............. 707/100 |
| 6,732,085 | B1 * | 5/2004 | Mozes .......................... 707/2 |
| 6,778,977 | B1 * | 8/2004 | Avadhanam et al. ........... 707/2 |

* cited by examiner

*Primary Examiner*—Frantz Coby
(74) *Attorney, Agent, or Firm*—Trop, Pruner & Hu (57) ABSTRACT

A stratified sampling mechanism is provided in a database system. The stratified sampling mechanism includes defining a clause in a query that indicates stratified sampling is desired. Data from a source table is stratified into different subgroups based on stratification conditions in the query. Sampling is performed within each subgroup.

26 Claims, 4 Drawing Sheets

STRATIFIED SAMPLING OF DATA IN A DATABASE SYSTEM

CROSS-REFERENCE TO RELATED APPLICATION

This is a continuation-in-part of U.S. Ser. No. 09/457,274, filed Dec. 8, 1999, now U.S. Pat. No. 6,564,221.

BACKGROUND

A database is a collection of stored data that is logically related and that is accessible by one or more users. A popular type of database is the relational database management system (RDBMS), which includes relational tables made up of rows and columns (also referred to as tuples and attributes). Each row represents an occurrence of an entity defined by a table, with an entity being a person, place, thing, or other object about which the table contains information.

To extract data from, or to update, a relational table in an RDBMS, queries according to a standard database query language (e.g., Structured Query Language or SQL) are used. Examples of SQL statements include INSERT, SELECT, UPDATE, and DELETE.

A common approach to data analysis on a large database is to work with samples of the data. A sample is a subset of the data chosen randomly so as to be representative of the entire data set. By working with samples instead of the entire data set, the processing time and system resource usage is made much more efficient.

The entire population of data contained in a data set may not be homogenous. For example, in maintaining records of shoppers at a retail outlet, it may be determined that 80% of the shoppers are male while 20% of the shoppers are female. If this is the case, it is sometimes desirable to obtain stratified random samples, as compared to simple random samples. Stratified random sampling involves dividing a given population into homogenous subgroups and then taking a simple random sample in each subgroup. Thus, in the above example, the population is divided into two subgroups, one female and one male.

In conventional database systems, taking stratified random samples require multiple passes through the data set, one for each subgroup. Thus, to obtain the stratified random samples, multiple SQL queries, one per subgroup, are needed. This is due to traditional SQL requirements that every query return only one relation as the result. Conventional techniques of obtaining stratified random samples are thus inefficient.

SUMMARY

In general, an efficient method and apparatus is provided to obtain stratified random samples in a database system. For example, a method of performing stratified sampling in a database system includes receiving a query containing a clause indicating stratified sampling of a source table is to be performed. The clause contains plural stratification conditions. The method further includes generating one or more commands to send to a processing module, with the one or more commands containing instructions to evaluate the stratification conditions and to perform sampling of data from the source table.

Other or alternative features will become more apparent from the following description, from the drawings and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
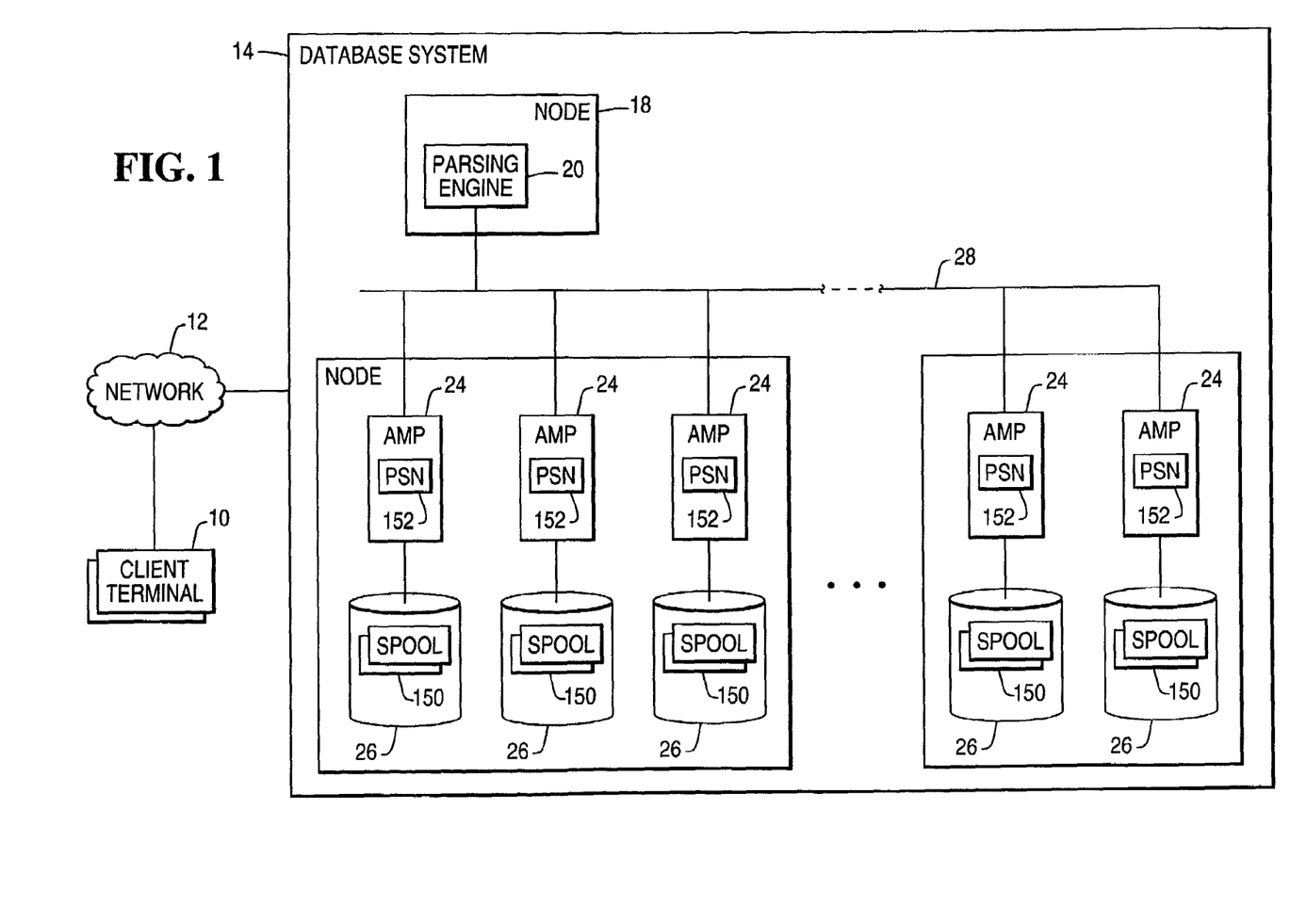
FIG. 1 is a block diagram of an example arrangement of a database system coupled to one or more client terminals.

In FIG. 1, a database system 14 is coupled over a data network 12 to one or more client terminals 10. Examples of the data network 12 include a local area network (LAN), a wide area network (WAN), the Internet, and so forth. The client terminal 10 is capable of issuing queries according to a standard database query language (such as Structured Query Language or SQL), as provided by the American National Standards Institute (ANSI). One version of SQL is the SQL-92 Standard, while another version is the SQL-99 Standard. In other embodiments, other versions of SQL or other standard database query languages can be used.

In the illustrated example arrangement, the database system 14 includes several nodes 18, with each node 18 including database management components. One node 18 includes a parsing engine (PE) 20. In response to a request, the parsing engine 20 checks the request for proper syntax, semantically evaluates the request, and develops an execution plan for the request. Note that although only one parsing engine 20 is shown in FIG. 1, the database system 14 can actually include multiple parsing engines that can reside on any of the nodes shown. The parsing engine also includes a scheduler to schedule the sequence in which steps corresponding to the query are to be executed. A "step" is a command or other form of instruction to indicate performance of an action. The steps are communicated over an interconnect layer 28 to access modules (or data server modules) 24 to manage access or manipulation of data stored in respective storage modules 26.

In one example embodiment, the access modules 24 are based on access module processors (AMPs) used in TERADATA® database systems from NCR Corporation. However, more generally, the term "access module" is used to refer to any module (whether implemented in software or hardware) that manages the access and manipulation of data stored in a storage system or module of a database system.

Each AMP is responsible for locking databases, tables, or portions of tables; creating, modifying, or deleting definitions of tables; inserting, deleting, or modifying rows within tables; and retrieving information from definitions and tables. The AMPs, after executing an action specified by the parsing engine 20, return responses to the parsing engine over the interconnect layer 28.

The arrangement of the database system 14 shown in FIG. 1 is an example of a parallel database arrangement, in which the multiple AMPs 24 are capable of concurrently accessing and manipulating data in respective storage modules 26. Each relational table stored in the database system is partitioned across the multiple AMPs and respective storage modules. In other words, a given table is divided into multiple partitions and stored in respective storage modules. In other embodiments, instead of a parallel database system, a single-node or uni-processor database system can be used.

An efficient technique is provided to perform stratified random sampling in the database system 14. In stratified random sampling, a data set containing a given population of data is divided into multiple subgroups (or strata). Within each subgroup (or stratum), random sampling is performed. Thus, for example, a population may be divided into male and female subgroups. Stratification can also be performed on the basis of age, professions, or other criteria.

In accordance with some embodiments of the invention, to enable efficient stratified random sampling, an SQL query (or a query according to another standard database query language) is extended to add a predefined clause (referred to as the SAMPLE STRATIFIED clause in one example embodiment) to indicate stratified sampling is to be performed. Note that the predefined clause to indicate performance of stratified sampling can have other names.

The SAMPLE STRATIFIED clause contains two elements: (1) a stratification/sub-grouping condition, and (2) the contribution from the subgroup. Note that multiple stratification/sub-grouping conditions and associated contributions are specified in the SAMPLE STRATIFIED clause. Each stratification or sub-grouping condition specifies the characteristic of members of the subgroup or stratum. The contribution can be expressed in one of two forms: a number of sample records requested for the subgroup or a fraction or percentage of the total records requested. The sum of the contributions of all subgroups is the size of the resulting sample.

An example query that includes the SAMPLE STRATIFIED clause is provided below.

```
SELECT       <select list>
FROM         <table list>
SAMPLE STRATIFIED
             WHEN (stratification condition) THEN <sample size>
             WHEN (stratification condition) THEN <sample size>
             ELSE <sample size>
[WHERE <search condition>].
```

The example query above is in the form of an SQL SELECT statement. The select list contains a list of all attributes from the one or more tables specified in the FROM clause that are to be produced as the output. A WHERE clause is an optional clause that specifies a search condition that table rows are to match to be produced at the output. In the SAMPLE STRATIFIED clause, each WHEN clause contains the stratification condition, and the corresponding THEN clause contains the sample size to indicate the relative size of the sample for the corresponding subgroup.

Note that the SAMPLE STRATIFIED clause in the SELECT query enables multiple stratification conditions to be specified in one query. This makes stratified random sampling more efficient as multiple separate queries need not be submitted to perform the stratified random sampling.

A more specific example query that includes a SAMPLE STRATIFIED clause is provided below:

```
SELECT sampleid, age, SUM(assets)
FROM employee
SAMPLE STRATIFIED   WHEN (sex = 'male' and age > 30) THEN 60
                    WHEN (sex = 'female' and age > 20)
                    THEN 30
                    WHEN (age > 40 and age < 50) THEN 10
WHERE Department = 'Finance' and Location = 'Los Angeles';
```

The result of the query in the example above includes a sample of 60 rows in the first subgroup (specified by the first stratification condition), a sample of 30 rows in the second subgroup (specified by the second stratification condition), and a sample of 10 rows in the third subgroup (specified by the third stratification condition). The total number of samples requested is 100 (60+30+10). The selected sample rows all satisfy the WHERE condition Department='Finance' and Location='Los Angeles'.

Figure 2:
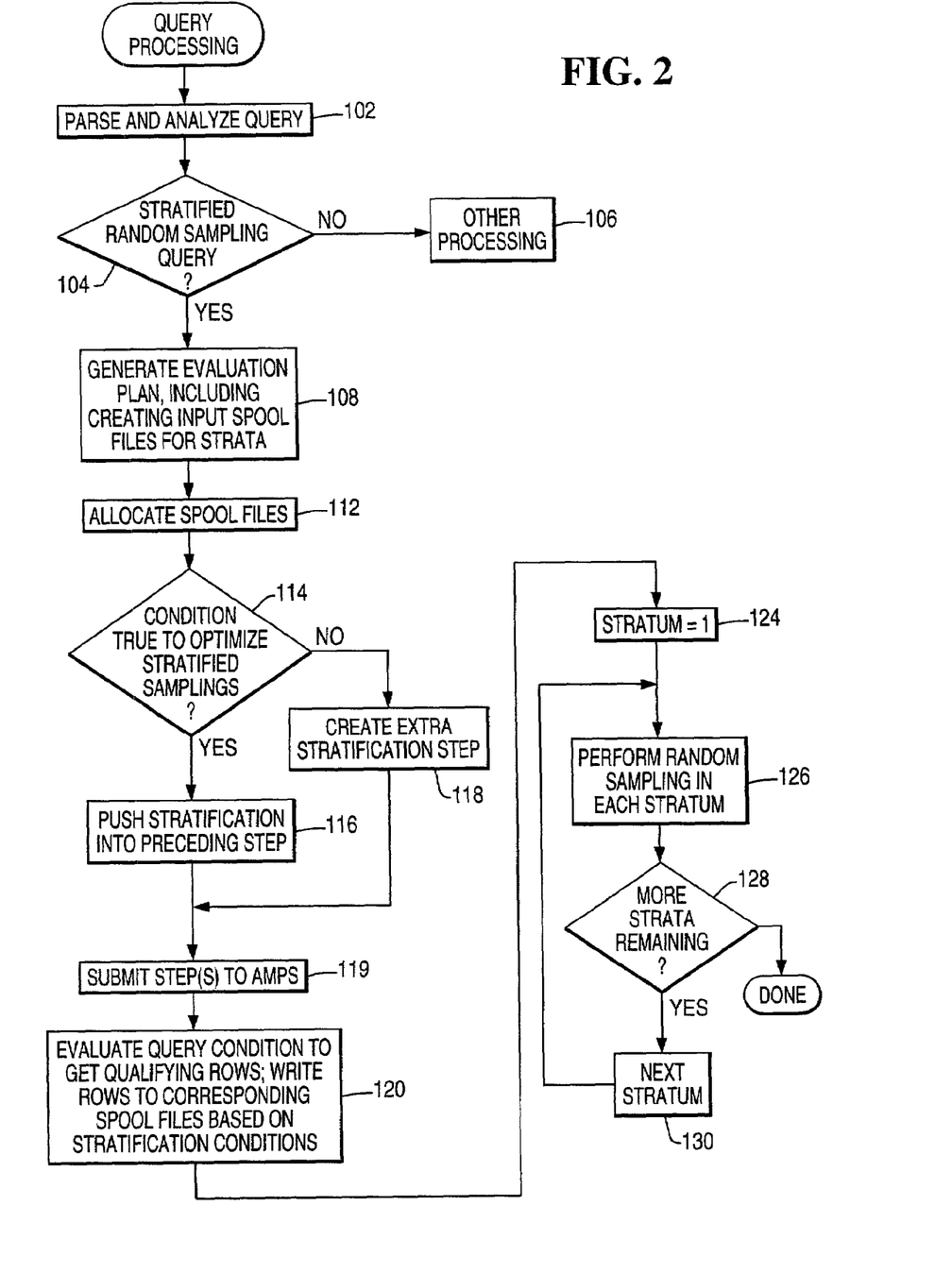
FIG. 2 is a flow diagram of a process performed by the database system, in accordance with an embodiment, to perform stratified random sampling.

FIG. 2 illustrates a process according to one embodiment of the invention for performing stratified random sampling. Upon receiving a query, the parsing engine 20 parses and analyzes the query (at 102). The parsing engine 20 looks for the SAMPLE STRATIFIED clause to determine (at 104) if the query is a stratified random sampling query. If not, then other processing is performed (at 106). However, if the query is a stratified random sampling query, then the parsing engine 20 generates (at 108) an evaluation plan that includes the creation of input spool files 150 (FIG. 1) for stratified sampling. The parsing engine 20 allocates (at 112) the input spool files such that one spool file is allocated per stratum. Thus, if the query specifies 3 strata, then 3 corresponding spool files are created.

Next, the parsing engine 20 checks (at 114) for a condition to determine if the requested stratified sampling can be optimized. Basically, the parsing engine 20 determines if the stratification actions specified by the stratified sampling query can be pushed into a preceding step to enhance processing efficiency. The query containing the SAMPLE STRATIFIED clause can be classified as either a simple query or a complex query. A "complex" query is one that contains one of the following: join, aggregate, or online analytical processing (OLAP). A simple query is one that does not contain any one of the above functions. If the query is a simple query, then the stratification actions can be pushed (at 116) into a preceding step (instead of generating an extra stratification step).

The "preceding" step is the step that is generated by the parsing engine 20 to process the query (e.g., to identify qualifying rows that match the search condition of a WHERE clause in the query). Pushing (at 116) the stratification actions into the preceding step refers to adding indications into the preceding step to determine whether the stratification conditions are satisfied and to write rows satisfying the stratification conditions into corresponding input spool files. This enhanced preceding step is referred to as an "enhanced step". The enhanced step is generated to perform the following: (1) process the query, such as to identify qualifying rows that match the search condition of the WHERE clause; (2) determine which stratum each of the qualifying rows is associated with based on the stratification conditions; and (3) write the qualifying row to the appropriate one of the input spool files based on determining which stratum the row belongs to.

The stratification actions cannot be pushed into a preceding step if the stratified sampling query is a complex query that performs one of a join, an aggregate, or OLAP function. If this is true, then a separate stratification step is generated (at 118) to perform the stratification actions. Next, the enhanced step (if the condition at 114 is satisfied) or the query step and separate stratification step (if the condition at 114 is not satisfied) are submitted (at 119) by the parsing engine 20 to each AMP.

The following provides some examples of simple and complex queries for purposes of illustration. A WHERE clause of a simple SQL query involves a selection criterion that involves columns from one table only. Thus, the example query, SELECT Name FROM EMPLOYEE SAMPLE STRATIFIED <conditions>WHERE Age>20, is a simple stratified random sampling query. However, if the WHERE clause of the query involves joins, then the query is a complex query. An example of a complex query with a join clause is:

```
SELECT E.name
FROM E, D
SAMPLE STRATIFIED <conditions>
WHERE E.id = D.id AND D.name = 'Finance';
```

An example of a complex query with an aggregate function is as follows:

```
SELECT E.deptid, SUM (E.salary)
FROM E
SAMPLE STRATIFIED <conditions>
GROUPBY E.deptid;
```

SUM is an example of an aggregate function that computes the sum of attribute values in a table. Other types of aggregate functions include AVG, MIN, MAX, and so forth.

Examples of OLAP functions include RANKING, MOVING AVERAGE, MOVING SUM, and so forth. One example complex stratified sampling query with an OLAP function is as follows:

```
SELECT E.name, E.deptid, RANK (E.salary)
FROM E
SAMPLE STRATIFIED <conditions>;
```

In response to the step(s) received at 119, each AMP evaluates (at 120) the query condition to obtain qualifying records. Based on the stratification conditions (contained either in an enhanced step or a separate stratification step), the AMP writes qualifying records to corresponding spool files. Next, beginning with the first stratum (at 124), each AMP performs the random sampling of records of each input spool file (at 126). The random sampling according to one embodiment is described in connection with FIGS. 3 and 4 below. Each AMP then determines (at 128) if there are more strata left. If so, the next stratum is processed (at 130). This is repeated until all strata have been processed and the random samples have been collected in each stratum.

As noted above, if the condition evaluated at 114 is true, the query with the SAMPLE STRATIFIED clause is executed by pushing the stratification actions into the step that identifies qualifying rows. Syntactically, the parsing engine accomplishes this by moving elements of the SAMPLE STRATIFIED clause to the select list of the SELECT clause as "virtual columns" embedded inside a CASE statement. Thus, in the example above, the SELECT statement becomes as follow:

```
SELECT sampleid, age, SUM (assets),
    CASE    WHEN (sex = 'male' and age > 30) THEN 1
            WHEN (sex = 'female' and age > 20) THEN 2
            WHEN (age > 40 and age < 50) THEN 3
FROM EMPLOYEE
WHERE Department = 'Finance' and Location = 'Los Angeles'.
```

In the CASE statement, if the first WHEN condition (stratification condition) is satisfied, then a stratum number of "1" is returned; if the second WHEN condition is satisfied, then a stratum number of "2" is returned; and if the third WHEN condition is satisfied, then a stratum number of "3" is returned. The stratum numbers are treated as virtual columns because they do not appear in the output even though they are in the select list. Upon evaluating the CASE statement for each row, the AMP uses the returned stratum number to append qualifying records to the correct spool file.

Figure 3:
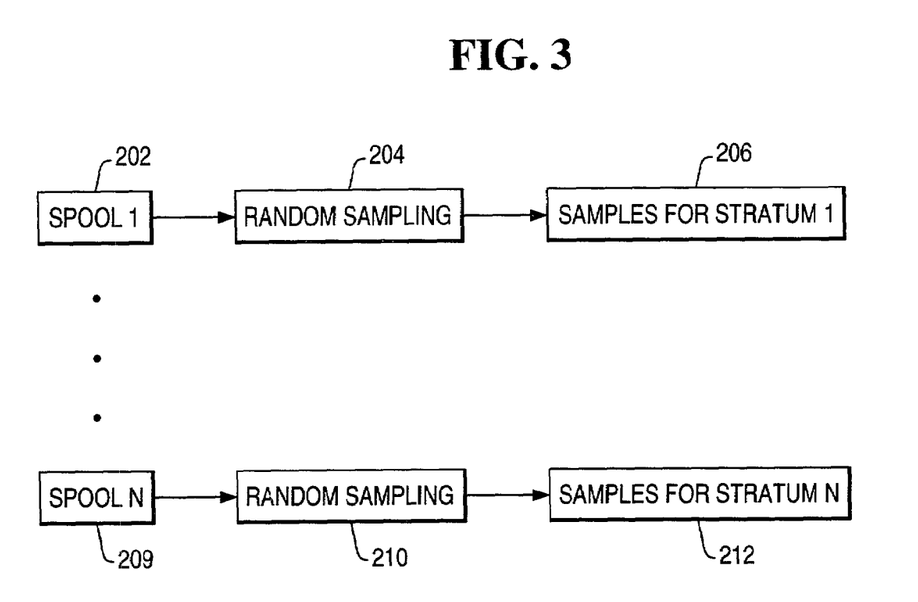
FIGS. 3 and 4 illustrate processes of performing random sampling in each stratum.

As shown in FIG. 3, a general process of obtaining random samples in plural strata is illustrated. The AMP receives N input spool files 202, 208 that correspond to plural strata. Random sampling is then performed (at 204, 210) of records in each spool file. Each AMP uses a pseudo-random number generator 152 (FIG. 1) to perform the random sampling. The sampling algorithm employed is random so that any sample data in a table is equally likely to be selected. The rows obtained as a result of the random sampling of each spool file are outputted as sample rows in a corresponding output file 206, 212.

If the database system 14 is a single uni-processor system with a single AMP, then the random sampling for each stratum is relatively straightforward, as the spool file for the stratum is non-partitioned. However, in a parallel database system environment where each spool file is partitioned across plural AMPs and stored in a plurality of partitions in respective storage modules, the random sampling is performed according to a process in FIG. 4 in one embodiment.

Figure 4:
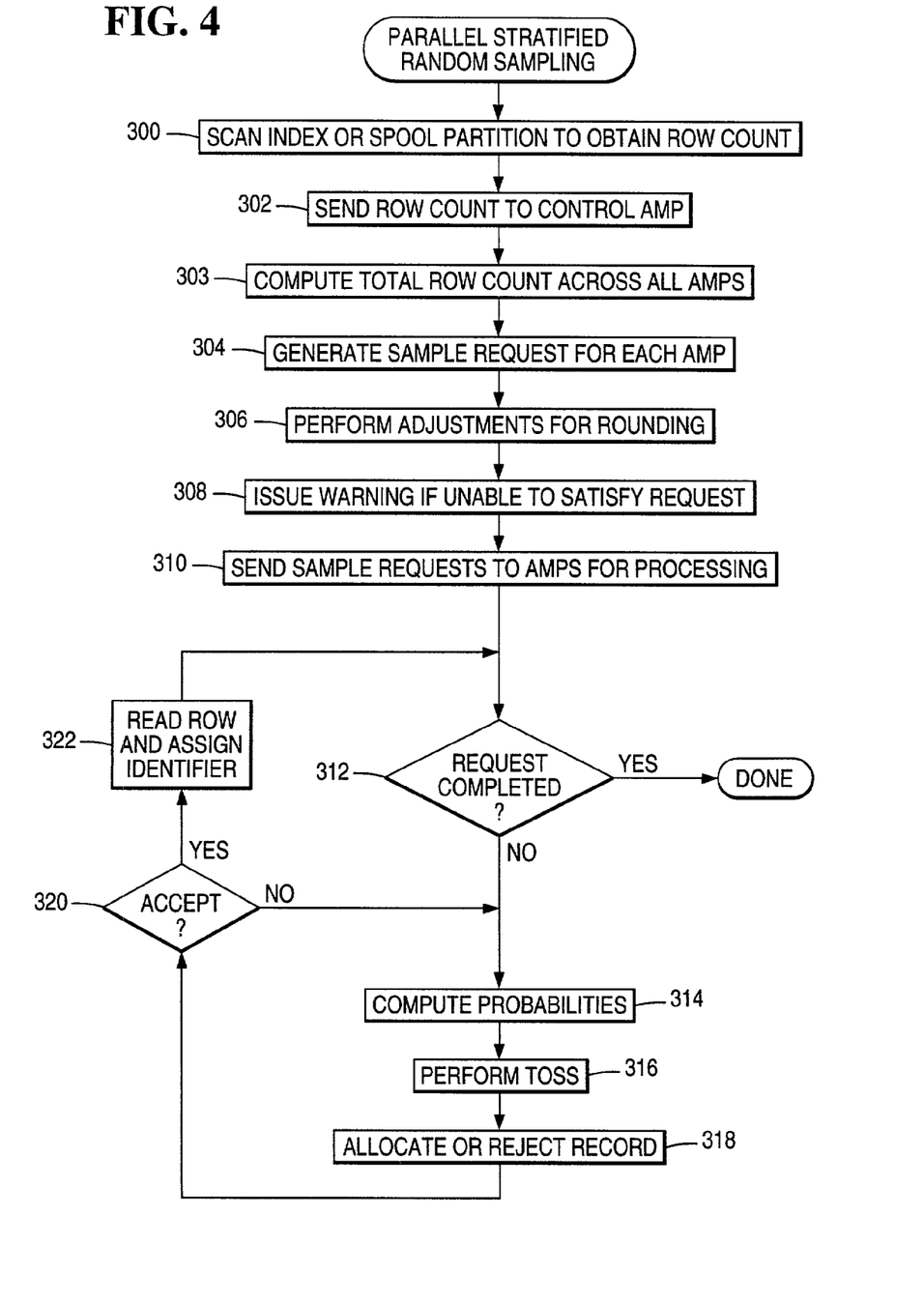

To perform random sampling in a parallel database system environment, the number of sample rows to be obtained at each AMP are first pre-allocated. The parallel random sampling algorithm preserves most of the randomness properties as the pre-allocation does not examine the data itself. Within each stratum, the input to the parallel random sampling process is the input spool file, which is partitioned across the multiple AMPs of the database system 14.

FIG. 4 shows a parallel random sampling process performed in accordance with one embodiment. The process is described with respect to one input spool file associated with one stratum. The same process is repeated for other input spool files associated with other strata. Each AMP determines the number of rows in the input spool file partition stored by the AMP by scanning (at 300) an index or the partition to obtain a count of rows stored on the corresponding storage module that is managed by the AMP. In some embodiments, each partition of an input spool file is stored as a B+ Tree indexed file (or some other type of index) on a respective storage module 26. The index contains information of how many rows are in each of the partitions. In one embodiment, the index is scanned to collect row counts for the partition. In other embodiments where no such index is available or where no such information is available in the index, each partition is scanned to obtain the row count. This row count is used in producing random samples of the input spool files generated by stratification.

Each AMP then sends (at 302) the row count to a designated AMP (referred to as the "control AMP"). The control AMP then computes (at 303) the total row count of partitions of the input spool file across all AMPs in the database system 14. This is a simple sum of the row counts received from the AMPs. The control AMP then computes how many sample rows are to be obtained from each AMP and generates (at 304) a sample request accordingly for each AMP. Generally, the control AMP allocates the number of sample rows requested from each of the AMPs in proportion to how many rows are stored on their associated storage modules.

The allocation of sample rows to be requested from each AMP is determined as follows. For each AMP, the control AMP computes a Proportional_Allocation parameter: Proportional_Allocation=Fraction*total_row_count, where "Fraction" is the fraction of the total rows that make up the sample request, and "total_row_count" is the total number of rows stored on the storage module associated with that AMP. The control AMP then performs adjustments (at 306) for purposes of rounding. If more rows than needed are allocated, then the Proportional_Allocation parameter for the last AMP is reduced. If there are not enough rows available to an AMP to fulfill its allocation of sample rows as indicated by the Proportional_Allocation parameter, then the Proportional_Allocation parameter for that AMP is reduced. If less rows than needed are allocated, then the control AMP allocates zero or more additional rows to the Proportional_Allocation parameters for each AMP until the total rows have been allocated. The control AMP considers the AMPs of the database system 14 in a random order to determine each of their allocation.

If the control AMP is unable to completely satisfy the sample request, then the control AMP issues warnings (at 308). Assuming the control AMP is able to satisfy the request, the control AMP sends (at 310) the sample requests, including the Proportional_Allocation parameter, to the AMPs for processing.

When each AMP receives its proportional allocation (in a sample request) from the control AMP, the receiving AMP executes the steps necessary to fulfill the sampling request. If the AMP determines (at 312) that the request has not been completed, the AMP finds the next "accepted" row, that is, a row that belongs to the requested sample. This is performed by computing (at 314) the current probabilities of the next row belonging to any of the samples. The probability is the number of rows remaining in the sample request divided by the total number of rows remaining.

The AMP then performs a random "toss" (at 316) to determine if the next row belongs to a sample (it is accepted or rejected). For example, assume that there are N rows stored in an AMP, and that it is desired to select n rows at random from the set of N rows, where $0<n \leq N$. Initially, variables t and m are set to zero ($t \leftarrow 0$, $m \leftarrow 0$), with m representing the number of rows selected (accepted) so far, and t representing the total number of input rows the AMP has processed. Then, a random number U is generated that is uniformly distributed between 0 and 1.

The AMP accepts or rejects (at 318) the next row based on the following comparison: $(N-t)*U \geq n-m$. If the comparison is true, the next row is skipped (that is, the row is rejected), and the variable t is incremented. However, if $(N-t)*U \geq n-m$ is not true, then the next row is selected (that is, accepted) for the sample and the variables m and t are each incremented by 1.

When an accepted row is found (at 320), the AMP reads the accepted row, assigns a sample identifier to the accepted row, and writes the accepted row to the output (at 322). In the case where multiple samples are requested but no identification is requested, the output will contain the requested sample rows, but there will be no identification information for the row.

The acts are repeated until the requested number of samples have been obtained. If m<n, then the AMP continues the sampling (along the "No" prong of decision block 312). However, if m<n is not true, then the sample is complete and the process terminates. Note that other algorithms can be used for parallel random sampling processes according to other embodiments.

One potential application of the stratified random sampling technique discussed here is the use of segmentation as a data mining technique. Segmentation includes subdividing a population according to known discriminators for marketing analysis. By using the stratified sampling technique discussed here, segmentation efficiency is enhanced.

In one specific example, online analytical processing (OLAP) tools summarize data from relational transactional systems and build multi-dimensional cubes that enable adhoc analysis. However, these tools are extremely sensitive to data sparsity and need help in figuring out what dimensions and attributes to consider. Stratified sampling can be used to analyze how data is distributed prior to cube design.

Another example application is the use of sampling to obtain approximate results in the analysis of large data sets. Stratified sampling can be used to materialize temporary tables or views against which queries desiring approximate answers can be executed.

Instructions of the various software routines or modules (e.g., parsing engine 20, access modules 24, and so forth) discussed herein may be stored on one or more storage units in the system and loaded for execution on corresponding control units. The control units include microprocessors, microcontrollers, processor cards (including one or more microprocessors or microcontrollers), or other control or computing devices. As used here, a "controller" or "processing module" refers to hardware, software, or a combination thereof. A "controller" or "processing module" can refer to a single component or to plural components (whether software or hardware).

The storage devices referred to in this discussion include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various software routines or modules in the system are stored in respective storage devices. The instructions when executed by a respective control unit cause the system to perform programmed acts.

The instructions of the software routines or modules are loaded or transported to the system in one of many different ways. For example, code segments including instructions stored on floppy disks, CD or DVD media, a hard disk, or transported through a network interface card, modem, or other interface device are loaded into the system and executed as corresponding software routines or modules. In the loading or transport process, data signals that are embodied in carrier waves (transmitted over telephone lines, network lines, wireless links, cables, and the like) may communicate the code segments, including instructions, to the system. Such carrier waves may be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of performing stratified sampling in a database system, comprising:
   receiving a query containing a clause indicating stratified sampling of a source table is to be preformed, the clause containing plural stratification conditions that specify plural strata in which sampling is to occur, the clause further containing sample sizes associated with respective strata; and
   generating one or more commands to send to a processing module, the one or more commands containing instructions to evaluate the stratification conditions contained in the clause and to perform stratified sampling of data from the source table, the stratified sampling producing samples having respective sizes specified by the sample sizes in the clause for respective strata.

2. The method of claim 1, further comprising writing data from a row of the source table into one of plural files depending on which of the stratification conditions the row satisfies.

3. The method of claim 2, further comprising performing sampling of data in the plural files in response to the one or more commands.

4. The method of claim 3, wherein the database system has plural access modules across which each file is partitioned,
   wherein performing the stratified sampling comprises performing sampling by each of the plural access modules of data in a corresponding partition of the file.

5. The method of claim 4, further comprising determining a number of samples to request from each access module.

6. A method of performing stratified sampling in a database system, comprising:
   receiving a query containing a clause indicating stratified sampling of a source table is to be performed, the clause containing plural stratification conditions;
   generating one or more commands, the one or more commands containing instructions to evaluate the stratification conditions and to perform sampling of data from the source table,
   wherein the plural stratification conditions correspond to plural strata;
   writing data from a row of the source table into one of plural files depending on which of the stratification conditions the row satisfies;
   performing sampling of data in the plural files in response to the one or more commands,
   wherein the database system has plural access modules across which each file is partitioned,
   wherein performing the sampling comprises performing sampling by each of the plural access modules of data in a corresponding partition of the file; and
   determining a number of samples to request from each access module,
   wherein determining the number of samples to request from each access module comprises calculating a number that is proportional to the number of rows in the corresponding partition.

7. The method of claim 1, wherein generating the one or more commands comprises generating a command to process the query and to perform stratification actions if a criterion is satisfied.

8. The method of claim 7, further comprising determining if the criterion is satisfied, wherein the criterion comprises the query being a simple query that does not specify a join, an aggregate, or an online analytical processing function.

9. The method of claim 7, further comprising generating a command to process the query and an extra command to perform the stratification actions if the criterion is not satisfied.

10. An article comprising at least one storage medium containing instructions that when executed cause a database system to:
    generate one or more commands to perform stratified sampling of data contained in a relational table partitioned across plural access modules of the database system; and
    send the one or more commands to the plural access modules of the database system to cause the plural access modules to perform the stratified sampling in parallel,
    each access module to perform the stratified sampling by
        writing records satisfying stratification conditions to respective files corresponding to respective strata specified by the stratification conditions, and
        performing random sampling of records in each of the files.

11. An article comprising at least one storage medium containing instructions that when executed cause a database system to:
    generate one or more commands to perform stratified sampling;
    send the one or more commands to plural access modules of the database system to cause the plural access modules to perform the stratified sampling in parallel; and
    receive a query containing a clause containing plural stratification conditions for the stratified sampling, the plural stratification conditions specifying plural strata, the clause further containing sample sizes for respective strata,
    wherein generating the one or more commands to perform the stratified sampling is in response to the received query.

12. The article of claim 11, wherein the instructions when executed cause the database system to generate plural spool files to receive rows for the plural strata.

13. The article of claim 12, wherein the instructions when executed cause the database system to perform random sampling of data in each spool file to obtain samples for a corresponding stratum, a number of samples in each stratum specified by a respective sample size in the clause of the query.

14. The article of claim 13, wherein each spool file is partitioned across the plural access modules, wherein the instructions when executed cause the database system to perform the random sampling of data in each spool file by performing random sampling in each access module.

15. A database system conspiring:
    a storage to stare a base table; and
    a controller adapted to receive a request containing plural stratification conditions to divide data in the base table into corresponding plural strata, the request further containing sample sizes associated with respective strata,
    the controller adapted to perform random sampling, in response to the request, of data in each stratum, the random sampling producing samples corresponding to the plural strata, the samples having respective sizes specified by the sample sizes in the request.

16. The database system of claim 15, further comprising plural storage modules, wherein the controller comprises plural access modules to manage data access in the corresponding plural storage modules.

17. The database system of claim 16, wherein the base table is partitioned across the plural access modules.

18. The database system of claim 17, wherein the controller is adapted to generate plural spool files to store data in the plural strata; and wherein the controller is adapted to perform random sampling of data in each spool file.

19. The database system of claim 18, wherein the controller is adapted to determine a number of samples to request from each access module.

20. The database system of claim 19, wherein the number of samples to request from one access module is different from the number of samples to request from another access module.

21. A database system comprising:

a plurality of storage modules;

a plurality of access modules to manage respective storage modules; and a parsing engine to receive a stratified sampling query specifying plural stratification conditions, the parsing engine to generate one or more commands to indicate performance of the stratified sampling, the parsing engine to send the one or more commands to the access modules, in response to the one or more commands, each access module to generate plural input spool files corresponding to plural strata, the input spool files to store qualifying rows from a source table, the access module to selectively write a given row into one of the input spool files based on which stratification condition the given row satisfies, each access module to further perform random sampling of the rows in each input spool file.

22. The method of claim 1, wherein receiving the query containing the clause containing the sample sizes comprises receiving the query containing the clause containing sample sizes specifying a respective number of rows in the respective sample for each stratum.

23. The method of claim 1, wherein receiving the query containing the clause containing the sample sizes comprises receiving the query containing the clause containing sample sizes specifying a percentage of a total number of rows in the respective sample for each stratum.

24. The article of claim 10, wherein each file is divided into plural partitions across the access modules, wherein performing the stratified sampling comprises performing sampling by each of the plural access modules in a corresponding partition of each file, the instructions when executed causing the database system to further determine a number of samples of a respective partition to request from each access module, the number proportional to a number of rows in the respective partition.

25. The database system of claim 15, wherein each sample size specifies one of (1) a number of sample rows for each stratum, and (2) a percentage of a total number of rows for each stratum.

26. The database system of claim 21, wherein the plural stratification conditions specify respective plural strata, the stratified sampling query further specifying sample sizes for respective strata, the sample sizes specifying a number of sample rows in each stratum.

* * * * *